(12) United States Patent
Fox

(10) Patent No.: US 11,775,273 B2
(45) Date of Patent: Oct. 3, 2023

(54) METHODS AND SYSTEMS OF SOFTWARE TESTING, DISTRIBUTION, INSTALLATION AND DEPLOYMENT

(71) Applicant: VeriVersion Labs Ltd., Tel-Aviv (IL)

(72) Inventor: Quinn Fox, Haifa (IL)

(73) Assignee: VeriVersion Labs Ltd., Tel-Aviv (IL)

( * ) Notice: Subject to any disclaimer, the term of this patent is extended or adjusted under 35 U.S.C. 154(b) by 0 days.

(21) Appl. No.: 16/307,498

(22) PCT Filed: Jun. 8, 2017

(86) PCT No.: PCT/IL2017/050647
§ 371 (c)(1),
(2) Date: Dec. 6, 2018

(87) PCT Pub. No.: WO2017/212496
PCT Pub. Date: Dec. 14, 2017

(65) Prior Publication Data
US 2019/0220262 A1    Jul. 18, 2019

Related U.S. Application Data

(60) Provisional application No. 62/347,106, filed on Jun. 8, 2016.

(51) Int. Cl.
*G06F 8/61* (2018.01)
*G06F 8/41* (2018.01)
(Continued)

(52) U.S. Cl.
CPC .................. *G06F 8/61* (2013.01); *G06F 8/41* (2013.01); *G06F 8/433* (2013.01); *G06F 8/60* (2013.01);
(Continued)

(58) Field of Classification Search
CPC ....... G06F 8/00–78; G06F 11/36–3696; G06F 8/61; G06F 8/41; G06F 8/433; G06F 8/60;
(Continued)

(56) References Cited

U.S. PATENT DOCUMENTS 4,558,413 A   12/1985  Schmidt et al.
5,408,665 A    4/1995  Fitzgerald
(Continued)

FOREIGN PATENT DOCUMENTS

WO    WO 2017/212496    12/2017

OTHER PUBLICATIONS

Kaur, Ramandeep, and Aman Arora. "Dependency Management in Component Based Systems." (2014). (Year: 2014).*
(Continued)

*Primary Examiner* — Kevin L Young
*Assistant Examiner* — Joanne G Macasiano

(57) ABSTRACT

A method of compiling a software application as modular software build, comprising: creating a dependency tree defining a plurality of dependency relations between a plurality of code segments of a software code of a software application, each one of the plurality of dependency relations defines at least one of a functionality dependency, a parameter dependency and a structure dependency between a pair of the plurality of code segments; separately compiling each of the a plurality of code segments into one of a plurality of executable segment modules; and creating a core module adapted to be installed on a client device having a processor for loading the plurality of executable segment modules according to the plurality of dependency relations for an execution of the software application.

19 Claims, 4 Drawing Sheets

(51) Int. Cl.
*G06F 8/60* (2018.01)
*G06F 8/71* (2018.01)
*G06F 8/75* (2018.01)
*G06F 11/36* (2006.01)

(52) U.S. Cl.
CPC .................. *G06F 8/71* (2013.01); *G06F 8/75* (2013.01); *G06F 11/3664* (2013.01); *G06F 11/3684* (2013.01); *G06F 11/3688* (2013.01); *G06F 11/3692* (2013.01)

(58) Field of Classification Search
CPC .......... G06F 8/71; G06F 8/75; G06F 11/3664; G06F 11/3684; G06F 11/3688; G06F 11/3692
See application file for complete search history.

(56) References Cited

U.S. PATENT DOCUMENTS

| 5,748,961 | A | 5/1998 | Hanna et al. | |
|---|---|---|---|---|
| 6,487,713 | B1 | 11/2002 | Cohen et al. | |
| 7,757,225 | B2 * | 7/2010 | Copeland | G06F 9/44521 707/705 |
| 8,752,000 | B2 * | 6/2014 | Granholm | G06F 9/453 717/101 |
| 8,924,935 | B1 * | 12/2014 | Chopra | G06F 8/71 717/120 |
| 9,286,179 | B1 * | 3/2016 | Shalla | G06F 11/3664 |
| 2003/0046673 | A1 * | 3/2003 | Copeland | G06F 8/443 717/163 |
| 2007/0234293 | A1 * | 10/2007 | Noller | G06F 11/3688 717/124 |
| 2009/0276760 | A1 * | 11/2009 | Zelov | G06F 11/3688 717/127 |
| 2011/0202905 | A1 * | 8/2011 | Mahajan | G06F 16/951 717/140 |
| 2011/0209142 | A1 | 8/2011 | Wookey | |
| 2013/0031527 | A1 * | 1/2013 | Granholm | G06F 9/453 717/101 |
| 2013/0152043 | A1 * | 6/2013 | Kuzmin | G06F 11/3676 717/110 |
| 2014/0047429 | A1 | 2/2014 | Gaither et al. | |
| 2014/0180961 | A1 * | 6/2014 | Hankins | G06Q 10/10 705/348 |
| 2015/0143524 | A1 * | 5/2015 | Chestna | G06F 8/30 726/25 |

OTHER PUBLICATIONS

Alshraideh, Mohammad. "A complete automation of unit testing for javascript programs." Journal of Computer Science 4.12 (2008): 1012. (Year: 2008).*
Allen, Robert, Remi Douence, and David Garlan. "Specifying and analyzing dynamic software architectures." Fundamental Approaches to Software Engineering: First International Conference, FASE'98 Held as Part of the Joint European Conferences on Theory and Practice of Software, ETAPS'98 Lisbon, Portugal (Year: 1998).*
International Preliminary Report on Patentability dated Dec. 20, 2018 From the International Bureau of WIPO Re. Application No. PCT/IL2017/050647. (13 Pages).
International Search Report and the Written Opinion dated Feb. 14, 2018 From the International Searching Authority Re. Application No. PCT/IL2017/050647. (23 Pages).
Invitation to Pay Additional Fees dated Dec. 5, 2017 From the International Searching Authority Re. Application No. PCT/IL2017/050647. (2 Pages).

* cited by examiner

METHODS AND SYSTEMS OF SOFTWARE TESTING, DISTRIBUTION, INSTALLATION AND DEPLOYMENT

RELATED APPLICATIONS

This application is a National Phase of PCT Patent Application No. PCT/IL2017/050647 having International filing date of Jun. 8, 2017, which claims the benefit of priority under 35 USC § 119(e) of U.S. Provisional Patent Application No. 62/347,106 filed on Jun. 8, 2016. The contents of the above applications are all incorporated by reference as if fully set forth herein in their entirety.

FIELD AND BACKGROUND OF THE INVENTION

The present invention, in some embodiments thereof, relates to management of software applications and, more particularly, but not exclusively, to testing, distribution, installation and deployment of software applications.

Software development generally consists of 6 phases: Requirements, Design, Development, Test Build, Testing and Release Build. After these phases, or any repetition of these phases, the complete software is ready to be distributed.

During the distribution phase the developer of the software provides a distribution system with the software executables and computing devices criteria to which the software may be distributed and installed upon.

When a computing device that answers the criteria requests the software executables it starts the installation phase, which enables the device to execute the software.

The support and maintenance of the service or the software provides is the deployment phase. It can roughly be said that the installation is the phase that happens on the device after the distribution phase, while the deployment is the process the developer is running after the distribution phase.

SUMMARY OF THE INVENTION

According to an aspect of some embodiments of the present invention there is provided a method of compiling a software application as modular software build, comprising: creating a dependency tree defining a plurality of dependency relations between a plurality of code segments of a software code of a software application, each one of the plurality of dependency relations defines at least one of a functionality dependency, a parameter dependency and a structure dependency between a pair of the plurality of code segments; separately compiling each of the a plurality of code segments into one of a plurality of executable segment modules; and creating a core module adapted to be installed on a client device having a processor for loading the plurality of executable segment modules according to the plurality of dependency relations for an execution of the software application. This structure allows flexibility in the installation and/or operation of the software application.

Optionally, the creating of the dependency tree includes assigning a version to each of the plurality of code segments to identify different versions of each of the plurality of code segments for loading on a client device.

Optionally, each of the plurality of relations defines how one of the plurality of executable segment modules uses properties and functionality provided by another of the plurality of executable segment modules.

Optionally, the compiling includes: building a module library for each code segment of the plurality of code segments; wherein the library includes relations of the plurality of relations, between the code segment and other code segments of the plurality of code segments; and wherein the building is done in an order which satisfies the dependency tree.

Optionally, the compiling includes: copying the software code into a designated folder; modifying the software code to support functions operated by the core module; and adding elements which are needed by the build process.

Optionally, at least one of the plurality of executable segment modules includes one of the plurality of code segments related to a feature of the software application to allow dynamic loading of the feature.

Optionally, the method further comprises: packaging the core module with the plurality of segment modules in at least one executable file for loading by a processor on a client device.

According to some embodiments of the invention there is provided a computer readable medium comprising computer executable instructions adapted to perform the method.

According to an aspect of some embodiments of the present invention there is provided a method of dynamic loading of a software application based on modular software build, comprising: accessing a plurality of executable segment modules, each is separately compiled from one of a plurality of code segments of a software code of a software application; accessing a dependency tree defining a plurality of relations between the plurality of code segments; selecting at least a subset of the plurality of executable segment modules to load on the client device based on characteristics of the software application and the client device, the at least subset is compatible with the dependency tree; and loading the at least subset of the plurality of executable segment modules by a processor on the client device.

Optionally, the loading includes installing the at least subset of the plurality of executable segment modules on the client device.

Optionally, the method further comprises, before the selecting: loading a default subset of the plurality of executable segment modules on the client device; and testing the software application on the client device based on a test script generated for the installation; wherein the characteristics include results of the testing.

More optionally, the method further comprises: repeating at least one of the testing and the selecting during operation of the software application to produce continuous or periodic test results.

More optionally, the method further comprises: sending results of the testing to be stored in a dataset of a distribution system and analyzed to produce at least one of recommendation and optimization for installations of the software application.

Optionally, the software application is provided to the client device via a distribution system based on test results of the software application.

Optionally, the characteristics include test results of the software application.

Optionally, the method further comprises: presenting a notification to a user of the client device, the notification including information relating to the installation.

According to an aspect of some embodiments of the present invention there is provided a method of testing a software application using reaction lists, comprising: activating a command in a software application to execute an action; asynchronously monitoring reactions of the software application following the activation and creating a reaction list of the reactions; comparing the reaction list to a list of expected reactions to identify reactions of the reaction list also included in the list of expected reactions; when a reaction of the reaction list is of a fatal type defined in a list of fatal reaction types, marking the reaction as fatal reaction; and when the reaction list includes all reactions which are included in the list of expected reactions and no reaction of the reaction list is marked as fatal, the action is marked as successful. This overcomes the flaw of data-driven testing by testing against all possible reactions of the software system and provides more complete report on problems in the software application.

Optionally, when the reaction list includes all reactions which are included in the list of expected reactions, activating a next command in the software application to execute a next action.

Optionally, when a predefined time is passed from the activation, activating a next command in the software application to execute a next action.

Optionally, when an adaptive time is passed from the activation, activating a next command in the software application to execute a next action; the adaptive time is determined based on previous executions of the action.

Optionally, the list of expected reactions is created by monitoring reactions of the software application following a known successful operation of the action.

According to an aspect of some embodiments of the present invention there is provided a method of software application distribution, comprising: storing in a dataset a plurality of test results of running a software application on a plurality of client devices; receiving a request from a client device to provide the software application for installation on the client device; and analyzing properties of the client device and the plurality of test results to produce at least one of recommendation and optimization for the installation.

According to an aspect of some embodiments of the present invention there is provided a method of software application installation, comprising: installing a software application on a client device; testing the software application on the client device based on a test script generated for the installation; analyzing results of the testing to produce a decision regarding an optimal configuration of the software application; and reconfiguring the installation based on the decision into the optimal configuration.

According to an aspect of some embodiments of the present invention there is provided a software application product for compiling a software application as modular software build, comprising: a non-transitory computer readable storage medium; first program instructions for creating a dependency tree defining a plurality of dependency relations between a plurality of code segments of a software code of a software application, each one of the plurality of dependency relations defines at least one of a functionality dependency, a parameter dependency and a structure dependency between a pair of the plurality of code segments; second program instructions for separately compiling each of the a plurality of code segments into one of a plurality of executable segment modules; and third program instructions for creating a core module adapted to be installed on a client device having a processor for loading the plurality of executable segment modules according to the plurality of dependency relations for an execution of the software application; wherein the first, second and third program instructions are executed by at least one computerized processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
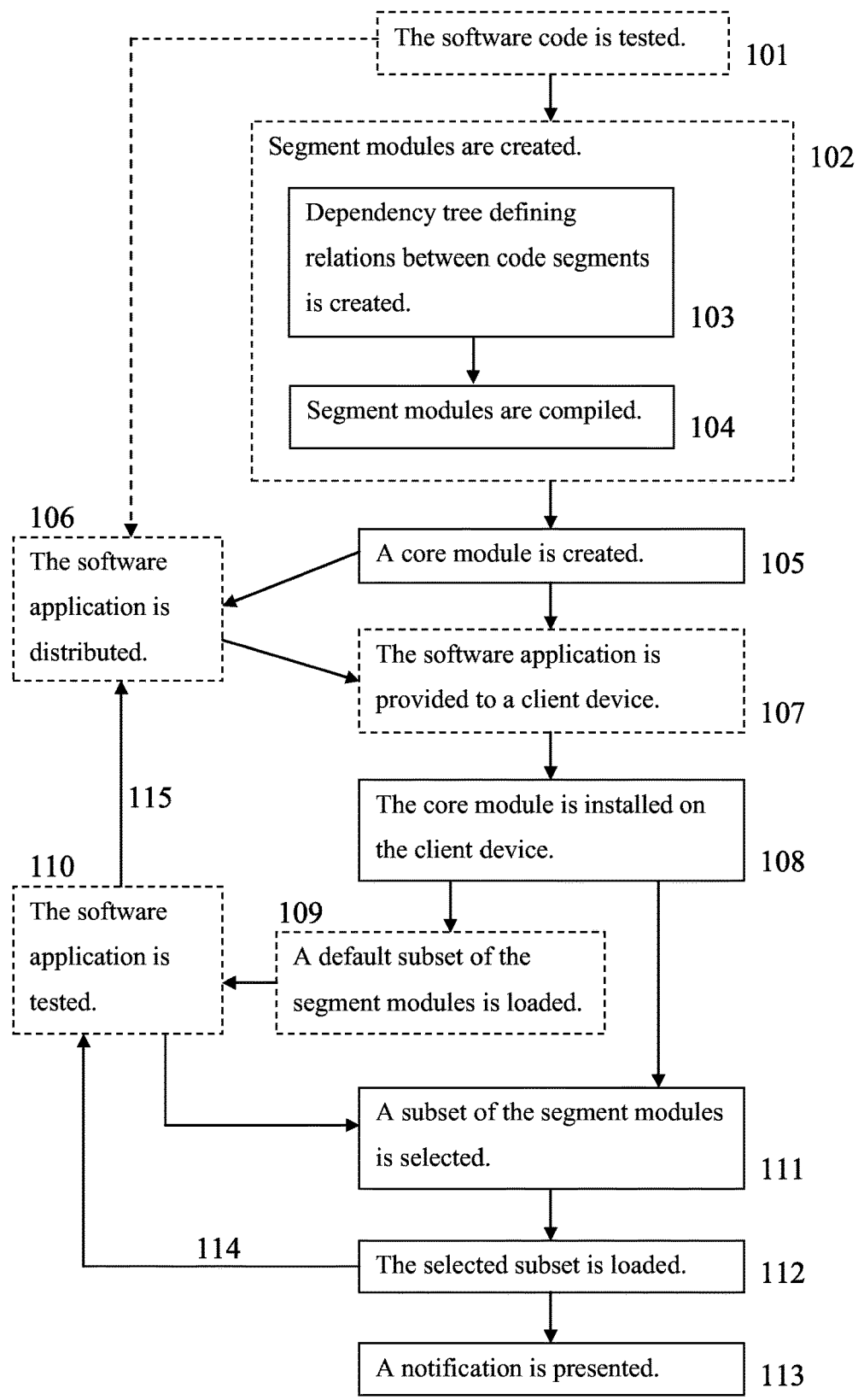
FIG. 1 is a flowchart schematically representing a method for dynamic installation of a software application based on modular software build, according to some embodiments of the present invention.

The present invention, in some embodiments thereof, relates to management of software applications and, more particularly, but not exclusively, to testing, distribution, installation and deployment of software applications.

According to some embodiments of the present invention, there are provided methods and systems for improving one or more of the stages of software deployment. The present invention includes a testing method for software application code, based on reaction lists, which may be used in stages of development and/or other stages of deployment. The present invention also includes a process for creating a modular software build for a software application which may be implemented at the test build and/or the release build phases. The modular software build is a software build which is composed of multiple separate software modules. The present invention also includes test-based installation of software application on a client device, and dynamic control of available features of the software application, optionally test-based. The present invention also includes test-based distribution of software applications, for example based on test-based installations on different devices. Any of these methods and systems may be used independently, or may be combined to further improve software deployment.

According to some embodiments of the present invention, there is provided a software application build process, which separates the code into one or more dependent interchangeable modules working together as a single executable software. This structure allows flexibility in the installation and/or operation of the software application.

When the development phase of a software system is complete the code is compiled or interpreted into a file or a number of files that may be deployed and execute/perform on other devices. This process is called build and the resulting files are called executables. Currently, build tools process the software code as a single module, multiple independent modules or unify multiple modules into a single module.

The modular software build, however, constructs a dependency tree of segment modules and a core module which exposes the segment modules to the OS and other external systems, dynamically loads them and manages their versions. A dependency is a connection between two modules that defines how one module uses properties or functionality provided by the other module. Since dependencies may change with different versions the dependency also defines which version of a module depends on which versions of the module it depends upon. Despite the modular structure of the resulting executable, the software still functions as a single system to external entities, such as OS and other systems.

The core module is then installed on a client device, and runs or installs some or all of the segment modules, compatible with the dependency tree. The decision of which modules to run or install may be done, for example, based on tests made during installation on the client device.

According to some embodiments of the present invention, there is provided a software application installation method which includes tests made on the client device. After an initial installation of the software application, tests are done (based on a test script generated for the installation and optionally included in the installation and/or retrieved from an external source), the results are analyzed and a decision is made of the optimal configuration of the software application. The installed software application is then reconfigured according to the decision. Optionally, tests and/or decisions are repeatedly made during the operation of the software application. This allows to dynamically control the installed modules and/or active features, based on tests and/or other parameters. The results of the tests from multiple client devices may also be used by a software distribution system to regulate availability of the software application, its versions, its features and/or its features versions.

According to some embodiments of the present invention, there is provided a method of testing a software application using reaction lists.

Manual software testing is done by a person (tester) operating the software system according to a written script describing a scenario of the software usage. At each step, the script describes: what the tester should do, for example click a certain button (This is referred to as an action) and what is the visible expected behavior, for example screen elements change (This is referred to as a reaction).

Existing automated software testing is strongly based on manual software testing methods. Automated software testing consists of scripts written in a scripting language, which have commands to operate elements, for example click a button; and assertion commands verifying that software element have an expected value, or do not have an unexpected value.

Both methods, manual and automated, may be described as data-driven testing. The main flaw of data-driven testing is that it is very difficult, and sometimes impossible, to test behaviors that have unexpected response time. For example, a click of a button (this is the action) that starts an animation (this is the reaction). Because the animation may take an unknown time to complete on different devices it is a difficult task to automatically verify that the animation indeed started and finished in a reasonable time period. Another major flaw of data-driven testing is that the writer of either manual or automated scripts, must know the expected behaviors. In manual testing this is limited to visible elements. In automated testing this requires the writer of the scripts to be closely familiar with the software implementation and the underlying mechanisms. It becomes virtually impossible to write a script that covers all behaviors and changes that happen in the background, which results in somewhat superficial testing.

To overcome the first flaw mentioned above, there are a few concepts on how to test event-driven architectures, sometimes called event-driven testing or asynchronous testing. These methods wrap each action with a timer. The test continues to the next action only after the expected reaction occurred or the timer timed out. When the timer times out before the expected reaction occurred, the test fails. Otherwise it passes.

Testing methods according to some embodiments of the present invention uses the same principal. However, unlike event-driven testing, it responds to all reactions occurring in the software system. Every reaction is checked against a list of all expected reactions. When the reaction was unexpected it is kept in a "blacklist" (and referred to as a black reaction). When it is expected it is kept in a "whitelist" (and referred to as a white reaction). The test continues to the next action only when the TR list is satisfied or the timer times out. Black reactions may be then categorized to fatal and non-fatal reactions. Reactions are marked as fatal when they are of a fatal type, defined in a list of fatal reaction types. The test passes when the expected reaction list and whitelist match and there are no fatal black reactions in the blacklist. Otherwise it fails.

This overcomes the second flaw of data-driven testing by testing against all possible reactions of the software system. This allows the test to provide a more complete report on problems in the software system. Not only an erroneous value, but also slow responses, the occurrence of unexpected reactions and the absence of expected reactions, be those reactions visible to the user, known to the developer or not.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
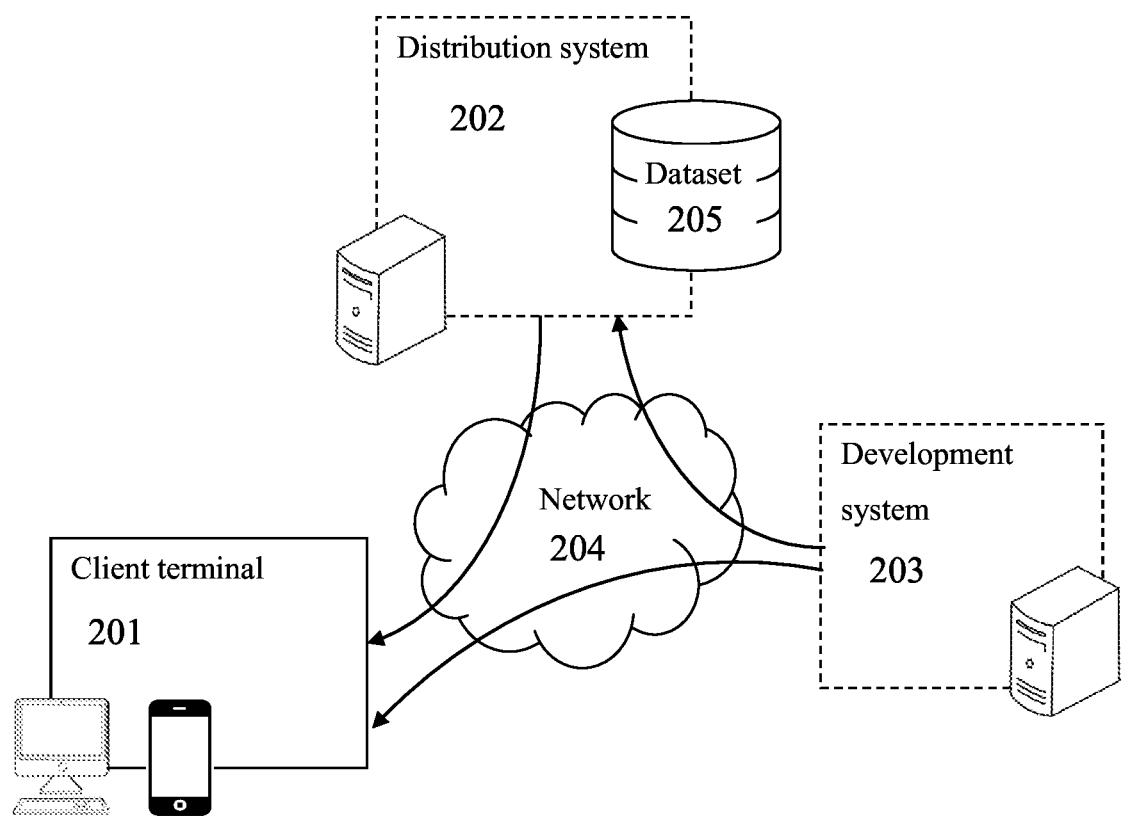
FIG. 2 is a schematic illustration of a system of testing, distribution, installation and deployment of software applications, according to some embodiments of the present invention.

Referring now to the drawings, FIG. 1 is a flowchart schematically representing a method for dynamic installation of a software application based on modular software build, according to some embodiments of the present invention. Reference is also made to FIG. 2, which is a schematic illustration of a system of testing, distribution, installation and deployment of software applications, according to some embodiments of the present invention.

First, optionally, as shown at 101, the software code of the software application is tested. This may be done by any software testing method, for example by using reaction lists, as described above and detailed below.

Then, as shown at 102, segment modules of the software code are created. The segment modules may be executable segment modules, which means that each of them is compiled or interpreted into a file or a number of files, but are not necessarily able to be deployed and/or execute independently. The software application may be, for example, a mobile application, a program for a computer and/or any other kind of software that is intended to be executed by a processor.

A module is a part of the software code that, given its dependencies, may be compiled and used on its own or as a module for other modules to depend on. Ideally, the module has a single, well-defined and unique purpose and function, but this is not necessary.

As shown at 103, a dependency tree defining a plurality of dependency relations is created between a plurality of code segments of a software code of a software application.

This may be done by a programmer, for example on a development system 203. Development system 203 may include one or more computing devices, for example, a laptop computer, a desktop computer, a workstation, a personal computer and/or any computing device.

A dependency is a connection between two modules that defines how one module uses properties or functionality provided by the other module. Each one of the dependency relations defines a functionality dependency, a parameter dependency and/or a structure dependency between a pair of the code segments. Examples of a functionality dependency may include dependency on static functions, global functions, class methods, ML files (as code), scripts, libraries, pre-compiled executables, code files, etc. Examples of a parameter dependency may include dependency on databases, class instances, static or global variables, local variables, fields, class members, files, assets, resources, ML files (as data), JavaScript object notation (JSON) strings, etc. Examples of a structure dependency may include, dependency on interface type that defines structure (for example in Java) or abstract classes.

Since dependencies may change with different versions the dependency also defines which version of a module depends on which versions of the module it depends upon. When A is dependent on B and B is dependent on C then A is dependent on B directly and on C indirectly. The dependency tree is a directional tree, that is, when A is dependent on B then B may not be dependent on A. Also, the dependency tree may not have circles of any length, that is, when $A_1$ is dependent on $A_2 \ldots A^n$ then $A_n$ may not be dependent on any of $A_1 \ldots A_{n-1}$, directly or indirectly. It is possible for A to be dependent on both B and C and for both B and C to be dependent on D.

Examples of other systems using dependency trees are Linux packages and Java external JARs dependency managers, such as Apache Maven and Gradle.

Figure 3:
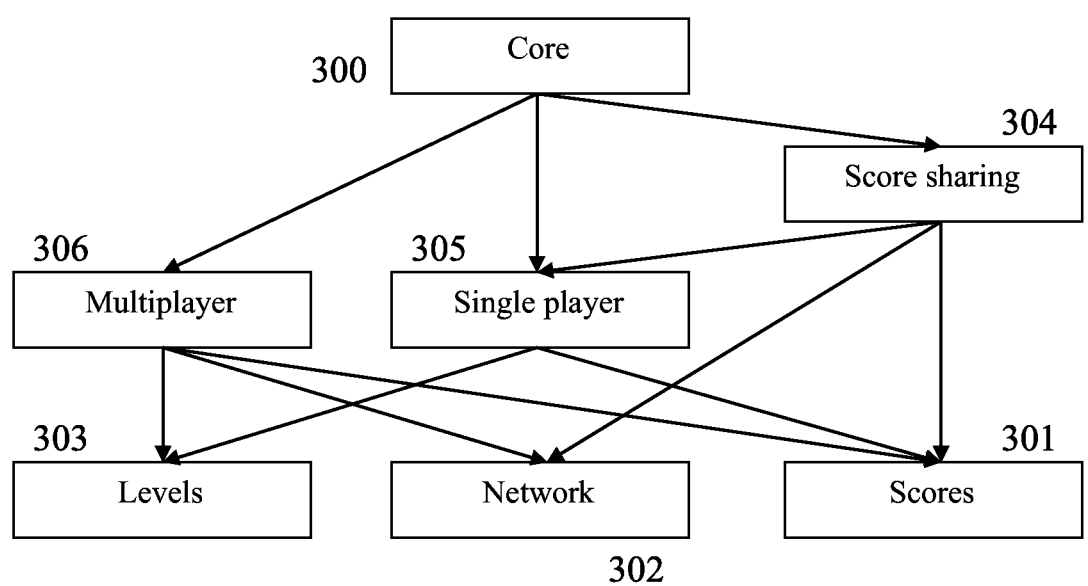
FIG. 3 is a flowchart schematically representing an exemplary dependency tree of a game software application, according to some embodiments of the present invention.

Reference is now made to FIG. 3, which is a flowchart schematically representing an exemplary dependency tree of a game software application, according to some embodiments of the present invention.

The game software application includes the following segment modules: a scores module 301 for managing the players' scores, a network module 302 for managing connections to the network, a levels module 303 for managing the levels of the game, a scores sharing module 304 for sharing the players' scores, a single player module 305 for allowing player to play on their own, and a multiplayer module 306 for allowing players to play with each other. The dependencies of the tree are depicted as arrows in the flowchart.

Optionally, the identification of code segments for the modules includes tagging the segments by separating the software code into compilable batches of code, each containing all of the code for a module, in order to build each module separately.

Optionally, the identification of code segments for the modules includes dependency tagging. Since some modules may be dependent on other modules, it is necessary to build them in the correct order. This may include adding, removing or upgrading dependencies with different versions.

Optionally, the identification of code segments for the modules includes assigning versions to the segments (versioning of the modules). Since some dependencies may change with different versions, it is necessary to maintain the version of each module and update the dependencies according to those versions.

Module tagging, dependency tagging and module versioning may be done manually by the developer using either, a few or all of the following: VCS tools e.g. Git, SVN, Mercurial, etc., by dividing the software code to branches, special commit comments, commit content, patches or any other method; IDE tools e.g. Android Studio, IntellliJ etc., by structuring the code into modules, packages, folders or any other method; Programming Language characteristics e.g. Java Packages, by designating a package to each module; code annotations, code comments and naming conventions by indicating which code part belong to which module; Maintaining a file or files to describe the modules.

Module tagging, dependency tagging and module versioning may also be done automatically by analyzing the code structure, usage of code elements, times that the code was edited and any of the manual methods mentioned above.

Module tagging, dependency tagging and module versioning may be done jointly or separately, be maintained during development or done ad-hoc when it is required by the build process.

Optionally, the modules are related to features of the software application. The features may be defined manually by a person deciding what functionality belongs to which feature and how they are dependent and their version. It may also be done automatically, for example by tagging a branch in the version control system (git, SVN, etc.) as a different feature and the version of that branch that is merged back to the trunk is the version of the feature. The branch is dependent on other branches (features) that were merged to the trunk for the same release. Optionally, it is verified that each feature is a proper one and that all the other features and their version that the feature depends on are proper. This is done to avoid having two features which are dependent on each other, which is not allowed by the feature management system, for example when the separation to features is arbitrary. This may be integrated in the module building process or done separately. The conflicts may be reported to the developer so the developer may resolve them, or resolve them automatically by joining and splitting features.

Then, as shown at 104, each of the code segments is separately compiled into one of a plurality of executable segment modules which are satisfying said dependency tree. Each segment module is compiled and then another of the segment modules is compiled.

The segment modules may be built in any order that satisfies the dependencies. In the example shown in FIG. 3 the order may be, for example, from first to last: scores module 301, network module 302, levels module 303, single player module 305, scores sharing module 304 and multi-player module 306. A core module 300 is built last because it depends on all other modules.

Optionally, the compilation includes building module libraries, in an order which satisfies the dependency tree. Optionally, the segment modules are created without compilations, for example when the software code includes scripted languages such as Python and/or JavaScript.

Optionally, the building of the module libraries includes ranking each of the modules. With the results of the identification of the modules, the rank of each module may be determined. The ranking is determined by two factors: the distance of the module from the core module in the dependency tree; and the number of modules dependent on this module. The distance factor is primary. This ranking guarantees that by iterating from the highest to lowest rank, each module is visited only after all the modules it depends upon have been visited.

Starting with the highest rank module each module is provided its dependencies and built such that it may be used itself as a dependency for other modules. The result of this build is referred to as a module library. A module library may or may not contain the libraries of the dependencies. Eventually, all modules are built and there is a module library available for each module.

Optionally, in order to build the modules without changing the developer's code, it is built in its own environment. This is done by copying the software code into a designated folder. Then the software code is modified, (some of the code is added, removed or changed) to support the functions needed to be operated by the core module. Then the configuration files, wrappers, settings or other elements needed by the build process are added. This may include the libraries of previously built modules For example, in order to build an Android project, an Android software development kit (SDK) is set up, an Android native development Kit (NDK) when needed, Gradle files, etc. Other settings may include Apache Maven files, Compilation flags, build scripts, etc.

Then, as shown at 105, a core module is created for loading the modules. The core module is adapted to be installed on a client device having a processor, for loading the segment modules according to the dependency relations for an execution of the software application.

The core module exposes the segment modules to the OS, dynamically loads them and manages versions of the modules. The main purpose of the core module is to broker between the external software elements such as the operating system (OS), and the internal modules of the software. The core module is dependent, directly or indirectly, on all other modules, in the dependency tree. The result of the core module build with all the module libraries is the software system ready to be deployed on other devices. Optionally, the core module is packaged with the segment modules, for example in one executable file.

Optionally, the process of creating the core module is similar to building the segment modules, but more of the code is generated rather than taken from the developer's code. The compilation is still based on the original code to identify the elements that need to be visible for other systems. Also, the configuration of the build is more dependent on the project's settings because they mostly affect how the software application is visible to other systems.

The core module may be generated automatically with all its components and not be changed by the developer. The core module may reflect elements from the original code but it is not a part of the original code and it may be generated during the build process, or prior to it during development. Since the core module reflects the inner modules to the operating system, they may be in any programming language as long as the core module is able to load and run them in runtime.

Externally, the core module reflects the modules to the OS and other software elements as needed. For example, when the OS requires some attributes to be declared by the software, the core module collects all those declarations from the other modules and declares them to the OS. For example, Android OS requires apps to declare their Activity components. The core module declares all the Activity components of all the app's modules.

Internally, the core module loads all of the other modules dynamically as needed by the software. This dynamic loading may happen at any stage and may be of all modules or just a few needed modules (lazy dynamic loading).

The core module has to analyze how the inner modules are structured, how to reflect their properties to the operating system, load and run the inner modules and how to use the operating system accordingly. This may also affect the build process for the inner modules. For example, in Android the activities are declared in the core module as described above. This means that in the core module there needs to be a class com.example.MainActivity. When the inner modules are built as Java code they may not have both the same package name and class name, that is, com.example.MainActivity must change its name, for example to: com.example.MainActivity_Methods. This further means that any calls to the superclass of the activity may no longer be done in the inner module but needs to be communicated to the core module. This may be done by adding an inner module that may statically call the core module, for example with a function like: Public Static Object callSuperClass(Activity activity);

The core module also needs to be able to switch the version of an inner module in runtime. This means that the structure of the core module must always be backwards compatible with all the previous versions that may be used. This may be done by adding all the references to static resources such as images, icons, layout files, strings, etc. by their respective versions. For example when there is an icon named ic_logo.png it is renamed and re-referred to as ic_logo_ver1.png for its first version, ic_logo_ver2.png for its second version etc.

Also, activities, services and other elements that are reported to the operating system are accumulated so that even when the element no longer exists in a later version it is still possible to access it when loading a previous version. For example, when a native Android app that has an Activity named com.example.OldActivity in version 1. When building the app com.example.OldActivity is added to the core module and is renamed in the inner module to com.example.OldActivity_Methods. Whenever a call to com.example.OldActivity is made, it is redirected to com.example.OldActivity_Methods. In version 2 com.example.OldActivity is replaced with com.example.NewActivity. When building the new app, com.example.NewActivity is added to the core module and com.example.OldActivity is not removed. In the inner module the com.example.OldActivity_Methods is removed and com.example.NewActivity is renamed to com.example.NewActivity_Methods. Any call to com.example.NewActivity is redirected to com.example.NewActivity_Methods. When rolling back the app to version 1, the inner module is replaced and now all calls to com.example.OldActivity are redirected to com.example.OldActivity_Methods.

Optionally, the core module keeps the versions of the reported elements, to support changes of modules properties as seen by the OS. For example, in a version 1 of a module, com.example.Activity is a portrait activity, but in version 2 the module supports both portrait and landscape orientations. The orientation support must be reported to the operating system. The core module keeps com.example.Activity_ver1 for the portrait activity and com.example.Activity_ver2 for the activity of version 2.

In many ways the core module is similar to an emulator running an internal application and the whole build process is similar to wrapping an emulator with an internal app. However, emulators are not app-specific, that is, they are built to support many kinds of apps, while the core module is specific to the inner modules. Another difference is that the core module is built to support updates and rollbacks of the inner modules. Moreover, the process supports the dependency tree and the separation to modules, which allows the ability to manage the versions of the modules.

Optionally, the core module is a virtualized environment with limited access to the OS that runs the segment modules in a "sandbox". For that matter, the segment modules may be in a language or architecture that are not supported by the OS, or even a new scripting/programming language, but still the core module may load them and run them dynamically. For example, on Android it is possible for the core module to run some sort of a Java virtual machine (JVM) with limited access to the Android application programming interfaces (APIs). The segment modules are still native Android code and compiled in '.dex' files. The core module dynamically loads and runs the segment modules internally, while providing them the resources they need from its own "sandbox".

Then, optionally, as shown at 107, the software application is provided to a client device 201.

Client device 201 may be any computing device, for example general purpose, such as watches, mobile devices, laptops, desktop computers, server computers, a mainframe computer, an enterprise server, a workstation, multiple connected computers and/or a personal computer.

Optionally, the software application is provided to client device 201 via a network 204. Network 204 may include, for example, local area network (LAN), a wireless network such as mobile network, wireless local area network (WLAN) such as Wireless Fidelity (WiFi™), a wireless personal area network (WPAN) such as Bluetooth™ protocol and/or any other network.

Optionally, as shown at 106, the software application is provided to client device 201 via a distribution system 202. Distribution system 202 may be any of the distribution systems existing today such as: Google Play Store, App Store, Chrome and Mozilla browsers extensions store, Microsoft Store, Amazon Store, etc; or an entirely new one. Distribution system 202 may also be another system wrapped around any or all of the existing distribution systems.

Optionally, a dataset 205 stores test results of running the software application on multiple client devices. Dataset 205 may include, for example, a digital data storage unit such as a magnetic drive and/or a solid state drive. Dataset 205 may also include, for example, a content delivery network or content distribution network (CDN) that is a large distributed system of servers deployed in multiple data centers across the internet. Optionally, dataset 205 is located on a server connected to client device 201 via network 204.

Optionally, the distribution is based on test results, for example by analyzing data from selected resources and developing an automated method to decide by that data how to distribute the software, or by using test results performed during and/or after installations as described below. Distribution system 202 may include dataset 205. When a request is received to provide the software application for installation on client device 201, the properties of client device 201, and the test results stored in dataset 205, are analyzed to produce recommendation and/or optimization for the installation.

Then, as shown at 108, the core module is installed on a client device 201.

Then, optionally, as shown at 109, a default subset of the modules is loaded and/or installed on client device 201, and the software application is tested, as shown at 110. The default subset may include, for example, the newest versions of each module, a most stable configuration of modules, beta versions of some modules and/or any other selection of modules.

Unlike testing practices today the testing is done on the device on which the software is to be installed rather than on devices designated for testing. During the testing stage tests are executed and/or performed on the installed software. The test may be done by using any of the testing platforms existing today such as: Selenium, Appium, UIAutomation, Espresso, Robotium, Instrumentation, etc; or with a new testing platform, such as the using reactions list as described below. Existing testing platforms may need to apply new modules to meet requirements as described below.

Optionally, the test is done by a test script which describes what tests need to be run and what are the expected results. The test script may be bundled with the software or provided separately, for example retrieved from an external source.

The testing may be done either before the software is accessible and usable by the user, in the background while the software is already accessible or perform as the user interacts with the software. Whether the software is accessible to the user while the testing stage is running or not, there may be a user visible indication that the testing stage is taking place.

Some existing testing methods require a physical connection between the device and the testing server and/or permissions (privileges) that may not be provided to regular software applications and/or users, such as root permissions, system permissions, developer permissions, etc. The testing stage refers to testing done with or without such connections and/or permissions.

The tests may store reports, screenshots, videos and other results locally or remotely. These results may be sent to the software developer or other services to improve the software service. The testing may include but not limited to: unit testing, integration testing, UI testing and performance testing. The tests may also be performed/executed at any time after the software has been installed, with or without altering the software behavior. It may also be possible to update the test script without updating the software, allowing to perform/execute new tests on the same software version.

Then, as shown at 111, a subset (or all) of the modules is selected to be loaded and/or installed on client device 201, which is compatible with the dependency tree. The selection may be done on the device itself and/or on a remote computer, and may be automatic or done manually. A decision may be made, for example, to install modules so that the software is fully available to the user; installed with limited functionality, graphic interface, data models and/or other components; or not be available to the user at all, either by providing an appropriate notification to the user and/or uninstalling the software entirely.

The selection is based on characteristics of the software application and client device 201. Optionally, the selection is done based on results of the testing performed on the default subset of modules installation. The results of the testing may be analyzed to produce a decision regarding an optimal configuration of the software application. For example, when client device 201 fails on a certain type of animations, these animations may be disabled throughout the software. A decision may also be made to revert to a previous version of the software application or recommend how to fix and/or improve performance. The logic of what components are installed and how they depend on the tests results may be a part of the software code, described in the test script provided and/or be done separately.

For example, the selection may be done according to test results of database performance. When something goes wrong with an upgrade of a database, the software usually is not able to operate properly and even crash. This kind of problem is almost never recoverable. When such an error is detected, the database may be rolled back to the previous schema that worked. As a result all the modules that are dependent on the database may either be disabled, or only the version that supports the previous version of the database is be available. This may be exemplified by the game dependency tree shown at FIG. 3. Suppose the levels module uses a database and that for the first version there is no multiplayer module. On the second version, the levels, single player and score sharing modules are upgraded and the multiplayer module is added. For some device an error occurs and the database upgrade fails. As a result the second version of the levels module may not run so the first version is run. Because the second version of the single player is dependent on the second version of the levels module it also may not run, so the first version of the single player module is run. The multiplayer is completely dependent on the second version of the levels module so it is not run at all. The score sharing module is indirectly dependent on the levels module, but does not use any property of the second version of the levels module, so it is run in the second version.

Optionally, the results of the testing performed on the default subset of modules installation and/or on any installed subset of modules is saved and used for future installations of a newer version of the software application and/or installation of other software applications.

Optionally, selection of subset of modules and/or decision (s) regarding other installation options may also be done, for example, based on parameters of client device 201, personal data of the user of client device 201, other software applications installed on client device 201, statistical testing data (for example received from distribution system 202) and/or any other information.

Then, as shown at 112, the selected subset of modules (or all modules) is loaded and/or installed on client device 201.

The modules may be packaged with the core module or may be obtained by the core module. For example, the core module may download the selected subset of modules via network 204 from distribution system 202, development system 203, a remote server and/or any other source. When a default subset of modules was installed, the installation is reconfigured and/or modified into the optimal configuration based on the decision.

Optionally, as shown at 113, a notification is presented on client device 201 for the user of client device 201. The notification may inform the user of the completion of the installation as a whole, the completion of the testing stage and/or of enabling the user interface which allows the user to interact with the software. Optionally, depending on the visibility of the testing to the user, the user notification stage may display indication of what stage has finished and results, success and/or error messages.

Optionally, tested installation is done for software applications which are not separated to modules, for example, by making decisions related to the software application as a whole, or by the code of the app to support different features and their versions. Optionally, testing may be done with any testing platform that may run on the end users devices.

Optionally, testing of installed modules (or other components) and/or decision making regarding installation may be integrated with the installation process itself and/or be done after the installation process is completed. When done after the installation process completed, it may be done immediately and/or at any later time and may repeat for every time the software application runs and/or be repeated at request and/or periodically. Optionally, as shown at 114, the testing (and/or decision making) is repeated during normal operation of the software application to produce continuous or periodic test results.

By performing these steps during the normal operation of the software application, it is possible to manage which features are available and what version of the feature is available, for example when segment modules are related to features as described above. It is also possible to disable the entire software or roll it back to a previous version.

Optionally, results of the test during installation and/or tests done during operation of the software application are sent and/or stored in a dataset and optionally used by distribution system 202 as described above, and as shown at 115.

The importance of running these tests during the normal operation of the software, after it has been installed, is that they allow the mechanisms to update and make decisions based on continuous and long-term changes that may occur to the device. For example: the device performance may deteriorate over time; the device hardware may be changed, such as by adding, removing or replacing memory cards, CPUs, motherboards or graphics cards; the device operating system may be changed by upgrading, downgrading or replace it entirely; the user may add, remove, upgrade or downgrade other software that may affect the performance or availability of some or all of the software modules or certain versions of them, for example the installation of another software that takes up a lot of memory and CPU time or a antivirus software that may block certain operations; the user may change the OS or software settings in a way that affects some or all of the software modules or certain versions of them, for example by making downloads available only on WiFi connection.

Optionally, the core module dynamically loads segment modules. A subset (or all) of the modules is selected to be loaded on client device 201, which is compatible with the dependency tree, and are loaded by the core module.

Optionally, the software application may be installed on one client device and run on another client device. For example, in app streaming, the app is not installed on the device itself (user's device), but on some other device in the cloud (cloud device). When the user runs it, it runs on either the cloud device or the user's device. When a change in the loaded modules is required, the user's device requests the module's files from the cloud device the same as it would from its own file system.

Figure 4:
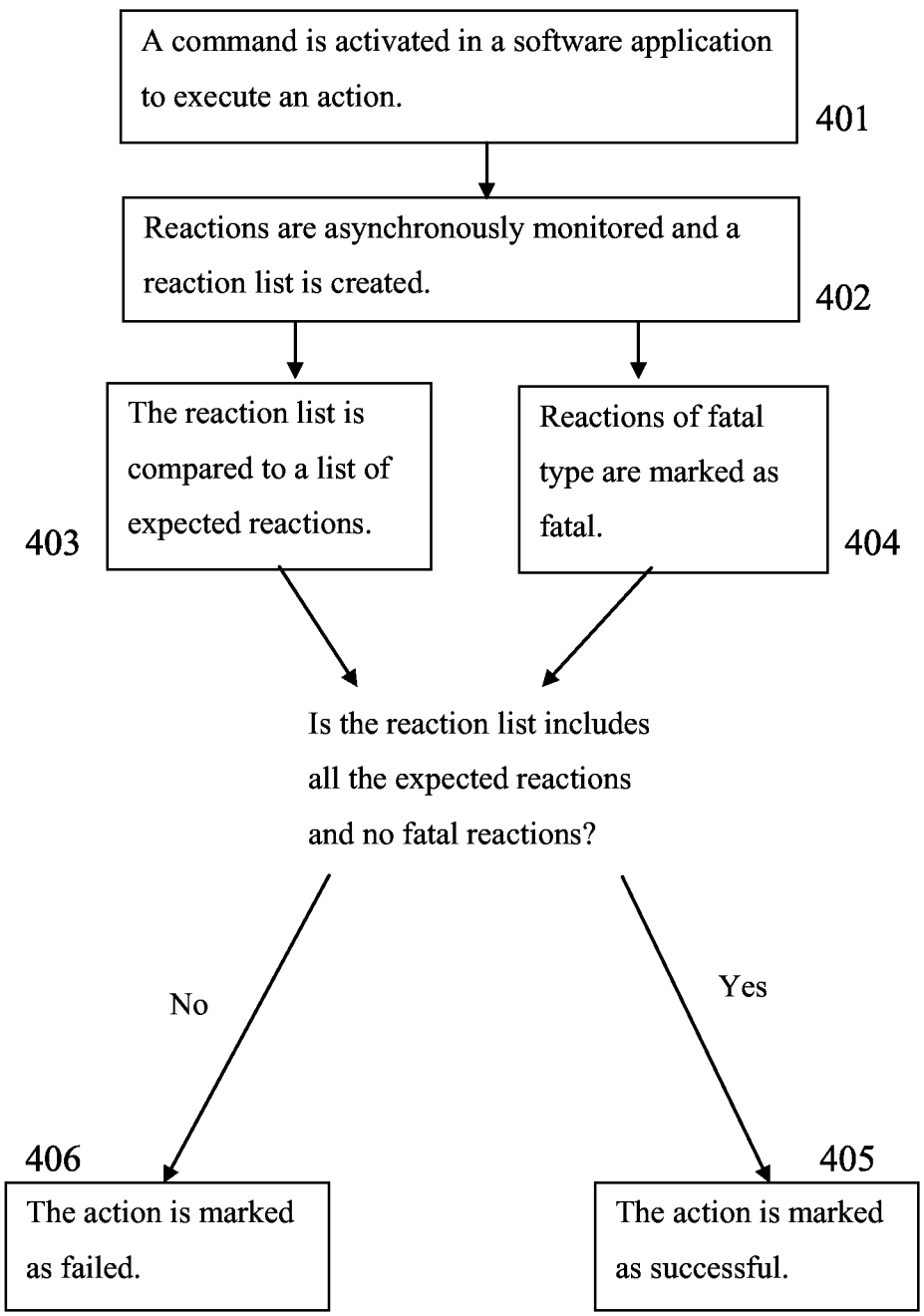
FIG. 4 is a flowchart schematically representing a method of testing a software application using reaction lists, according to some embodiments of the present invention.

Reference is now made to FIG. 4, which is a flowchart schematically representing a method of testing a software application using reaction lists, according to some embodiments of the present invention.

First, as shown at 401, a command is activated in a software application to execute an action.

Then, as shown at 402, reactions of the software application following the activation are asynchronously monitored and a reaction list of these reactions is created. Asynchronous or event-driven monitoring supports operations which may simultaneously occur in the system. These operations are usually implemented by the OS using processes and threads. When an operation needs to report, it sends an event. These events may be monitored as they happen and the operations they indicate are compared to the reactions.

The test may include mechanisms for identifying reactions related to, for example, exceptions, functionality, layout, performance (such as CPU usage, memory usage, the time it take to complete an operation, battery consumption, etc.), connections and/or local databases. For example, to identify expected and unexpected exceptions and extract data, mechanisms may be implemented to connect into the developer's exception handling and propagate it to testing, write exceptions into a log file and synchronize those log files when the system is available, hook into system failure events and report them immediately and/or store them in log files, read system logs and/or tag different exceptions with data that help to identify the source of the exceptions.

Then, as shown at 403, the reaction list is compared to a list of expected reactions. Reactions of the list which are included in the list of expected reactions are marked as expected. This may also be described or implemented as moving the reactions to a whitelist, and may also include moving to a blacklist any reaction which is not included in the list of expected reactions.

Also, as shown at 404, when a reaction of the list is of a fatal type, it is marked as fatal. Optionally, the fatal reaction types are defined in a fatal types list. The fatal reaction types may include, for example, exceptions and crashes (caught or uncaught); database upgrade fails; database operation (Create, Read, Update or Delete) fails; action fails to perform required functionality (for example, a button that is required to show a popup when clicked, does not show the popup when clicked on some devices); action performance (such as CPU usage, memory usage, battery consumed, running time) exceeds a defined threshold; user interface (UI) elements do not comply with their definitions (for example: in color, size, font, etc.); and/or network not connected when required.

Then, as shown at 405, when the reaction list includes all reactions which are included in the list of expected reactions and no reactions are marked as fatal, the action is marked as successful. Alternatively, as shown at 406, the action is marked as failed.

Optionally, the list of expected reactions is created by monitoring the reactions of the software application following the action, in a known successful operation of the action.

Optionally, the reaction list includes reactions which are not included in the list of expected reactions and are not marked fatal (also referred to as black non-fatal reactions). For example, on systems with multiple screen properties, such as Android, it is recommended to produce only non-fatal errors to inform the developer that there could be a layout error but it is inconclusive.

Optionally, when the reaction list includes all reactions which are included in the list of expected reactions, the action test ends and a next action may be tested.

Optionally, the test ends only when a predefined time has passed (the action test times out), even when the reaction list already includes all reactions which are included in the list of expected reactions. This allows more time for fatal or black non fatal reactions to occur, making it a more thorough and robust test. This kind of test, however, is more time and resources consuming.

Optionally, the test ends when an adaptive time has passed (the action test times out). The time is automatically adjusted at each run of the test, for example based on the time it takes for the reaction list to include all reactions which are included in the list of expected reactions. This helps to create shorter timers and generate a prediction of the time performance of the action. This kind of test, however, is more prone to false negatives, that is, reporting an error that would not have occurred had the timer been slightly longer.

Optionally, the reaction list is compared with more than one list of expected reactions, for example based on a functionality criteria. The list of expected reactions to be used may be chosen according to the criteria at the time of execution. The difficulty with functionality testing is that in most cases the functionality changes based on other parameters local or remote. For example, a game unlocks a level once the player has reached a certain score, so it is expected that for certain players the button shows a message telling them they should improve their score, and for other player the screen changes to that new level. The logic behind the functionality of elements may be very complex and in many cases the functionality itself is implemented correctly, but the developers made mistakes when checking the criteria for this functionality, or did not expect certain criteria affect the functionality at certain times. Multiple lists of expected reactions may reveal not only errors of unexpected reactions but also unexpected criteria values that affect functionality. Optionally, multiple lists of expected reactions for a single functionality element are created by combining recordings of selected scenarios and functionalities. Optionally, some of the functionality errors are set as non-fatal to avoid false errors.

Following is an exemplary pseudo-code describing a test of a software application using reaction lists:

1. Perform action;
2. Start timer;
3. While timer has not finished, do:
   1. Catch asynchronous events, do:
      1. Add the event to the reactions list;
      2. If the event is in the expected reactions list, then:
         1. Add the event and timing to the whitelist;
      3. Else:
         1. Add the event and timing to the blacklist;
         2. (Optional) If event is fatal, then:
            1. (Optional) Return fail, whitelist, blacklist;
   4. If software crashed, then:

```
1. Return fail, whitelist, blacklist, crash report;
5. Else:
    1. If blacklist is empty, then:
        1. If whitelist and expected reactions list are equal:
            1. Return pass, whitelist, blacklist;
        2. Else:
            1. Return fail, whitelist, blacklist;
    2. Else:
        1. If blacklist contains fatal events, then:
            1. Return fail, whitelist, blacklist;
        2. Else:
            1. Return pass with warnings, whitelist, blacklist;
```

Following is an exemplary expected reactions list (whitelist) for an Android application:
1. Action: Start app
   1. Reaction: App created
   2. Reaction: Main Activity created
   3. Reaction: Main Activity started
   4. Reaction: Main Activity resumed
2. Action: Click "test" button
   1. Reaction: "test" button is disabled
   2. Reaction: Value of text view changed to "testing . . . "
   3. Reaction: Animation started
   4. Reaction: Animation finished
   5. Reaction: "test" button is enabled
3. Action: Close app
   1. Reaction: Main Activity paused
   2. Reaction: Main Activity stopped
   3. Reaction: Main Activity destroyed Following is an exemplary result of running the above test:
1. Action: Start app
   1. Result: pass with warnings
   2. Whitelist:
      1. Reaction: App created
      2. Reaction: Main Activity created
      3. Reaction: Main Activity started
      4. Reaction: Main Activity resumed
   3. Blacklist:
      1. Reaction: Sent statistics report to server [non-fatal]
2. Action: Click "test" button
   1. Result: fail
   2. Whitelist:
      1. Reaction: "test" button is disabled
      2. Reaction: Value of text view changed to "testing . . . "
      3. Reaction: Animation started
   3. Blacklist:
      1. Reaction: Text view exceeds screen limits [non-fatal]
      2. Reaction: Animation takes too long [fatal]
   4. Crash report:
      1. Message: Out of Memory Exception
      2. Stacktrace . . . .

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant software applications will be developed and the scope of the term software application is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of software application installation, comprising:
    performing on a client device a test of a software application installed on the client device based on a test script generated for installing the software application and running on the client device;
    performing, on said client device, an analysis of results of said test, by identifying a certain code segment to be reconfigured to a different version, based on an analysis of a dependency tree defining a plurality of dependency relations between a plurality of code segments of a software code of the software application;
    producing a reconfiguration of a code of said software application based on an outcome of the analysis of results of said test, said reconfiguration of the code of said software application includes said different version of said certain code segment; and
    reconfiguring a version of said software application for a further installation of the software application on the client device based on said reconfiguration,
    wherein the method is repeated periodically during normal operation of the software application; and
    wherein said test, said analysis, and said code are configured to facilitate performing on the client device the steps of said performing the analysis, said producing, and said reconfiguring, wherein said reconfiguring being performed without requiring a developer of said software application to change said code.

2. The method of claim 1, wherein each one of said plurality of dependency relations defines at least one of a functionality dependency, a parameter dependency and a structure dependency between a pair of said plurality of code segments.

3. The method of claim 2, wherein the reconfiguring comprises reverting or rolling back the certain code segment.

4. The method of claim 2, wherein the certain code segment is reconfigured based on characteristics of the software application and the client device.

5. The method of claim 4, wherein the characteristics are determined based on the outcome of the analysis.

6. The method of claim 2, wherein said further installation includes compiling each of said plurality of code segments into one or more executable and dynamically loadable segment modules; wherein the compiling includes modifying said software code to support functions operated by a core module of said software application.

7. The method of claim 2, wherein said further installation includes compiling each of said plurality of code segments into one or more executable and dynamically loadable segment modules;
    wherein said compiling includes:
    building a module library for each code segment of said plurality of code segments;
    wherein said library includes relations of said plurality of dependency relations, between said code segment and other code segments of said plurality of code segments; and
    wherein said building is done in an order which satisfies said dependency tree.

8. The method of claim 1, wherein the software application and the test script are bundled together.

9. The method of claim 1, wherein the test is performed in the a background while a user interacts with the software application.

10. The method of claim 1, wherein a user visible indication is presented when the test is performed.

11. The method of claim 1, wherein a connection is established between the client device and a testing server for performing the test.

12. The method of claim 1, wherein the test comprises a test selected from the group consisting of a unit test, an integration test, a user interface (UI) test and a performance test.

13. The method of claim 1, wherein the test is performed without altering a software behavior of the software application.

14. The method of claim 1, further comprising:
    sending the results of the testing to be stored in a dataset of a distribution system and analyzed to produce at least one of recommendation and optimization for installations of the software application.

15. The method of claim 1, wherein the software application is provided to the client device via a distribution system based on test results of the software application.

16. The method of claim 1, wherein during the further installation a previous version of the software application is installed.

17. The method of claim 1, further comprising:
    presenting a notification to a user of the client device, the notification including information relating to the results of the test.

18. A non-transitory computer readable storage medium comprising computer executable instructions adapted to perform the method of claim 1.

19. A distribution system for software application installation, comprising:
    a network interface for forwarding a software application for installation on a client device and a test script generated for the installation of the software application, the test script is executable for performing a test of the software application on the client device; and
    at least one processor of said client device, adapted to:
    run said test script on said client device;
    perform, on said client device, an analysis of results of the test, by identifying a certain code segment to be reconfigured to a different version, based on an analysis of a dependency tree defining a plurality of dependency relations between a plurality of code segments of a software code of the software application,
    produce a reconfiguration of a code of the software application based on an outcome of the analysis of results of the test, said reconfiguration of the code of said software application includes said different version of said certain code segment; and reconfigure a new version of the software application for a new installation of the software application on the client device based on the reconfiguration, wherein the running, the performing, the producing and the reconfiguring are repeated periodically during normal operation of the software application; and wherein said test, said analysis, and said code are configured to facilitate said at least one processor when residing on the client device to perform the analysis, produce the reconfiguration, and reconfigure the new version, wherein said at least one processor being further adapted to reconfigure the new version without requiring a developer of said software application to change said code.

\* \* \* \* \*